US011379409B2

(12) United States Patent
Bono

(10) Patent No.: US 11,379,409 B2
(45) Date of Patent: Jul. 5, 2022

(54) SYSTEM AND METHOD FOR MANAGING FILE SYSTEM REFERENCES AT SCALE

(71) Applicant: EMC IP Holding Company LLC, Hopkinton, MA (US)

(72) Inventor: Jean-Pierre Bono, Westboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 122 days.

(21) Appl. No.: 16/672,284

(22) Filed: Nov. 1, 2019

(65) Prior Publication Data

US 2021/0133144 A1 May 6, 2021

(51) Int. Cl.
*G06F 16/00* (2019.01)
*G06F 16/11* (2019.01)
*G06F 16/13* (2019.01)

(52) U.S. Cl.
CPC ............ *G06F 16/122* (2019.01); *G06F 16/13* (2019.01)

(58) Field of Classification Search
CPC .............................. G06F 16/122; G06F 16/13
See application file for complete search history.

(56) References Cited

U.S. PATENT DOCUMENTS

| | | | |
|---|---|---|---|
| 7,383,412 B1* | 6/2008 | Diard | G06F 9/52 711/170 |
| 7,506,213 B1* | 3/2009 | Cabrera, III | G06F 11/0727 714/26 |
| 7,526,634 B1* | 4/2009 | Duluk, Jr. | G06F 9/52 712/216 |
| 8,751,763 B1* | 6/2014 | Ramarao | G06F 16/1752 711/162 |
| 2006/0187963 A1* | 8/2006 | Basso | H04L 49/90 370/474 |
| 2008/0104358 A1* | 5/2008 | Noel | G06F 12/126 711/170 |
| 2016/0283498 A1* | 9/2016 | Beaverson | G06F 16/137 |
| 2017/0371947 A1* | 12/2017 | Golander | G06F 16/9024 |
| 2021/0042141 A1* | 2/2021 | De Marco | G06F 9/45558 |

OTHER PUBLICATIONS

Dr. Amit Golander, NetApp; "ZUFS—How to develop an efficient PM-based file system in user space"; SNIA Storage Development Conference EMEA; Feb. 2018.
Dr. Amit Golander, NetApp; "ZUFS—Simplifying the Development of PM-Based File Systems"; SNIA Persistent Memory Summit 2018; Jan. 24, 2018.
Shachar Sharon (NetApp); "ZUFS Overview—Developing PMEM-based File-System in User-Space"; Persistent Programming In Real Life(PIRL'19), University of California, San Diego; Jul. 22, 2019; https://pirl.nvsl.io/program/.

* cited by examiner

*Primary Examiner* — Shew Fen Lin
(74) *Attorney, Agent, or Firm* — Chamberlain, Hrdlicka, White, Williams & Aughtry

(57) ABSTRACT

A system for managing file systems includes memory. The system also includes a manager. The memory is used for storing in-memory data structures. The manager obtains file system references for a file system from a file system manager. The file system manager utilizes storage to provide the file system references. The manager stores the file system references in an in-memory data structure in the memory. To service file system reference requests, the manager utilizes uses the in-memory data structure to service at least one of the file system reference requests.

17 Claims, 11 Drawing Sheets

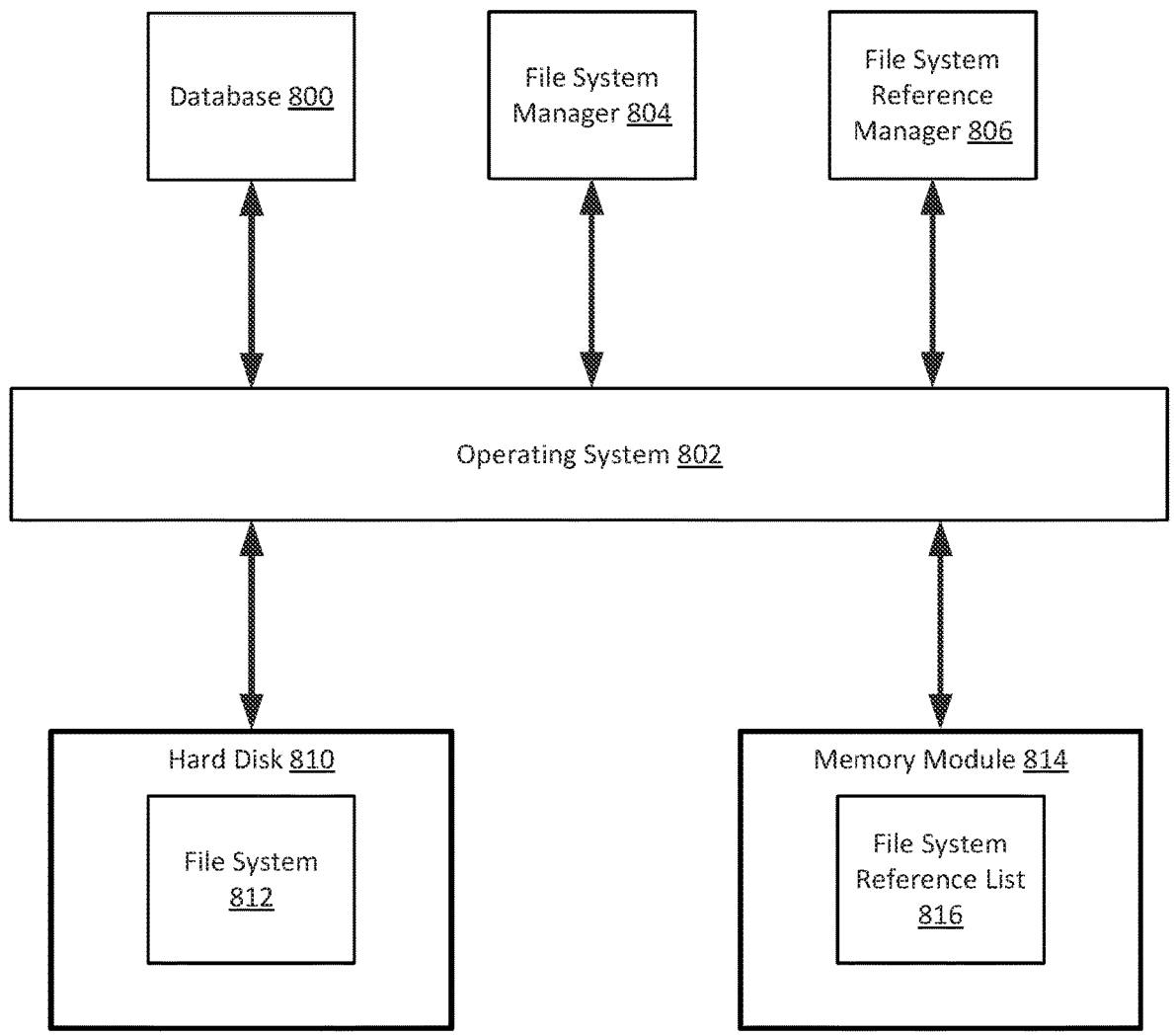
FIG. 8.1

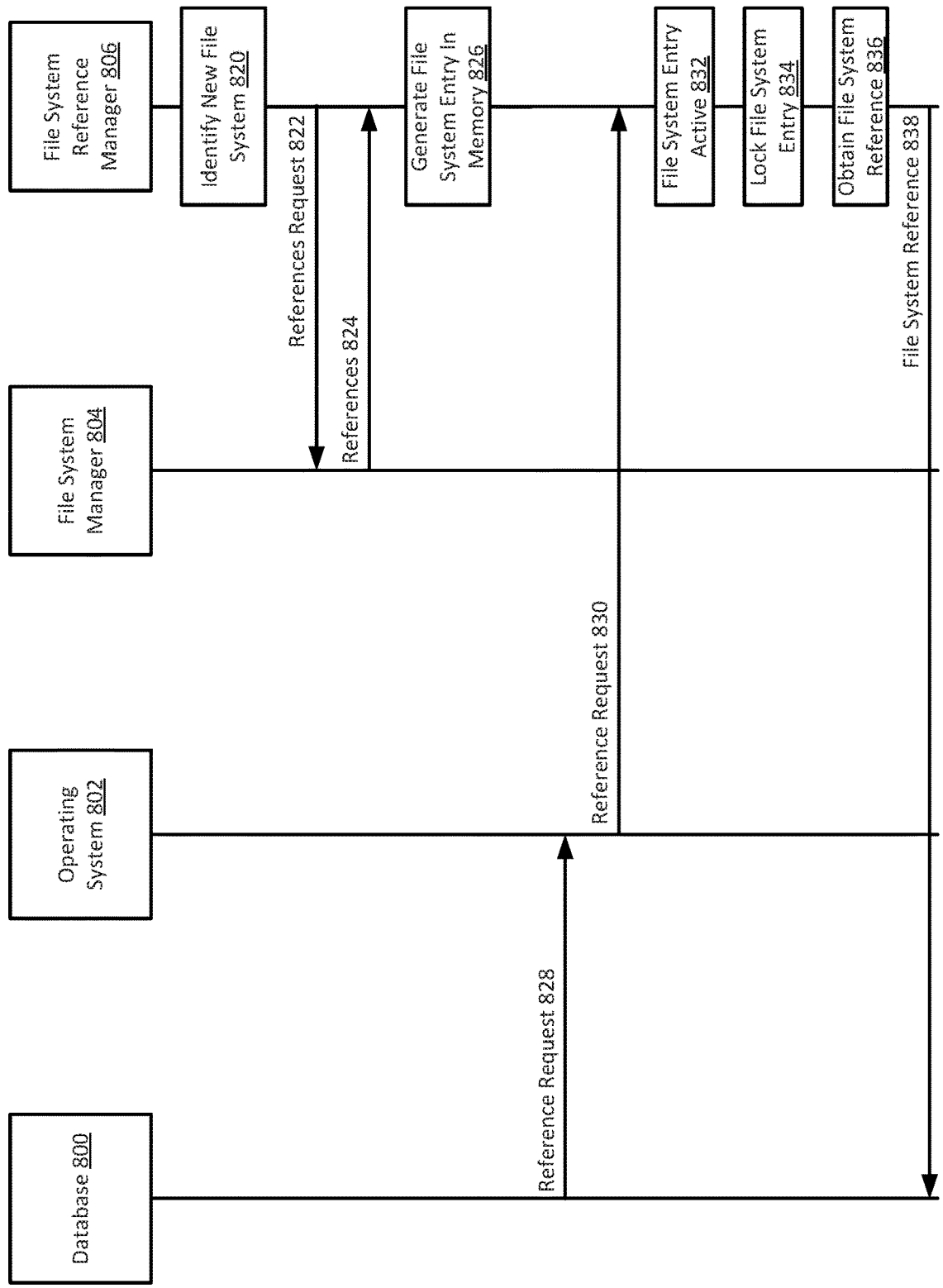
FIG. 8.2

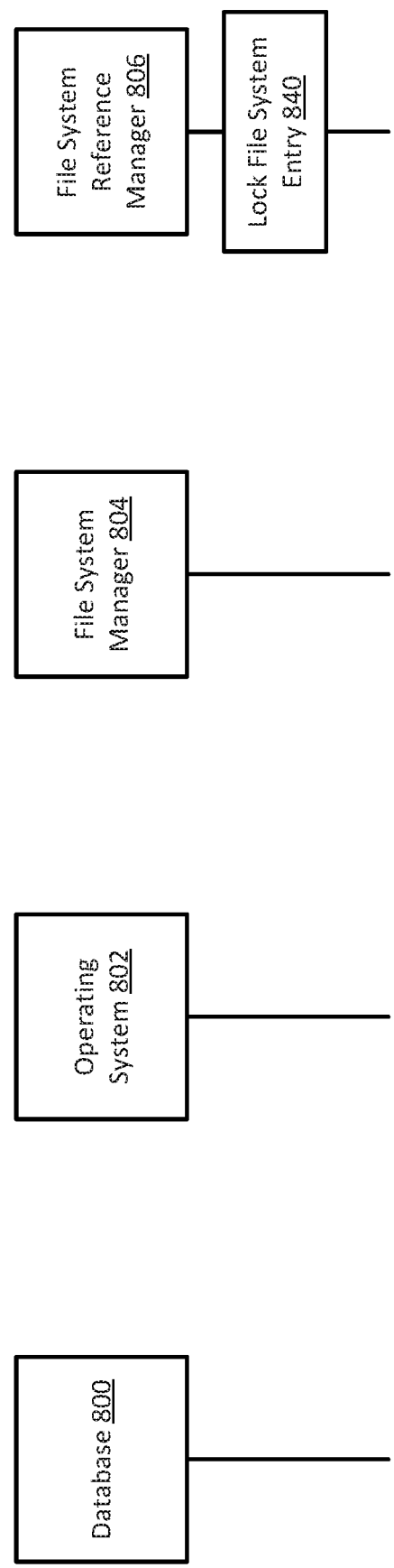
FIG. 8.3

US 11,379,409 B2

SYSTEM AND METHOD FOR MANAGING FILE SYSTEM REFERENCES AT SCALE

BACKGROUND

Devices may generate new data based on existing data. For example, devices may obtain data and derive new data based on the obtained data. When data is generated, it may need to be stored for future use.

SUMMARY

In one aspect, a system for managing file systems in accordance with one or more embodiments of the invention includes memory and a manager. The manager obtains file system references for a file system from a file system manager that utilizes storage to provide the file system references; stores the file system references in an in-memory data structure in the memory; and services a file system reference request for the file system using the in-memory data structure.

In one aspect, a method for managing file systems in accordance with one or more embodiments of the invention includes obtaining file system references for a file system from a file system manager that utilizes storage to provide the file system references; storing the file system references in an in-memory data structure; and servicing a file system reference request for the file system using the in-memory data structure.

In one aspect, a non-transitory computer readable medium in accordance with one or more embodiments of the invention includes computer readable program code, which when executed by a computer processor enables the computer processor to perform a method for managing file systems. The method includes obtaining file system references for a file system from a file system manager that utilizes storage to provide the file system references; storing the file system references in an in-memory data structure; and servicing a file system reference request for the file system using the in-memory data structure.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 8.1 shows a diagram of an example system.

FIGS. 8.2-8.3 show diagrams of interactions between and actions performed by components of the example system of FIG. 8.1 over time.

DETAILED DESCRIPTION

Figure 1:
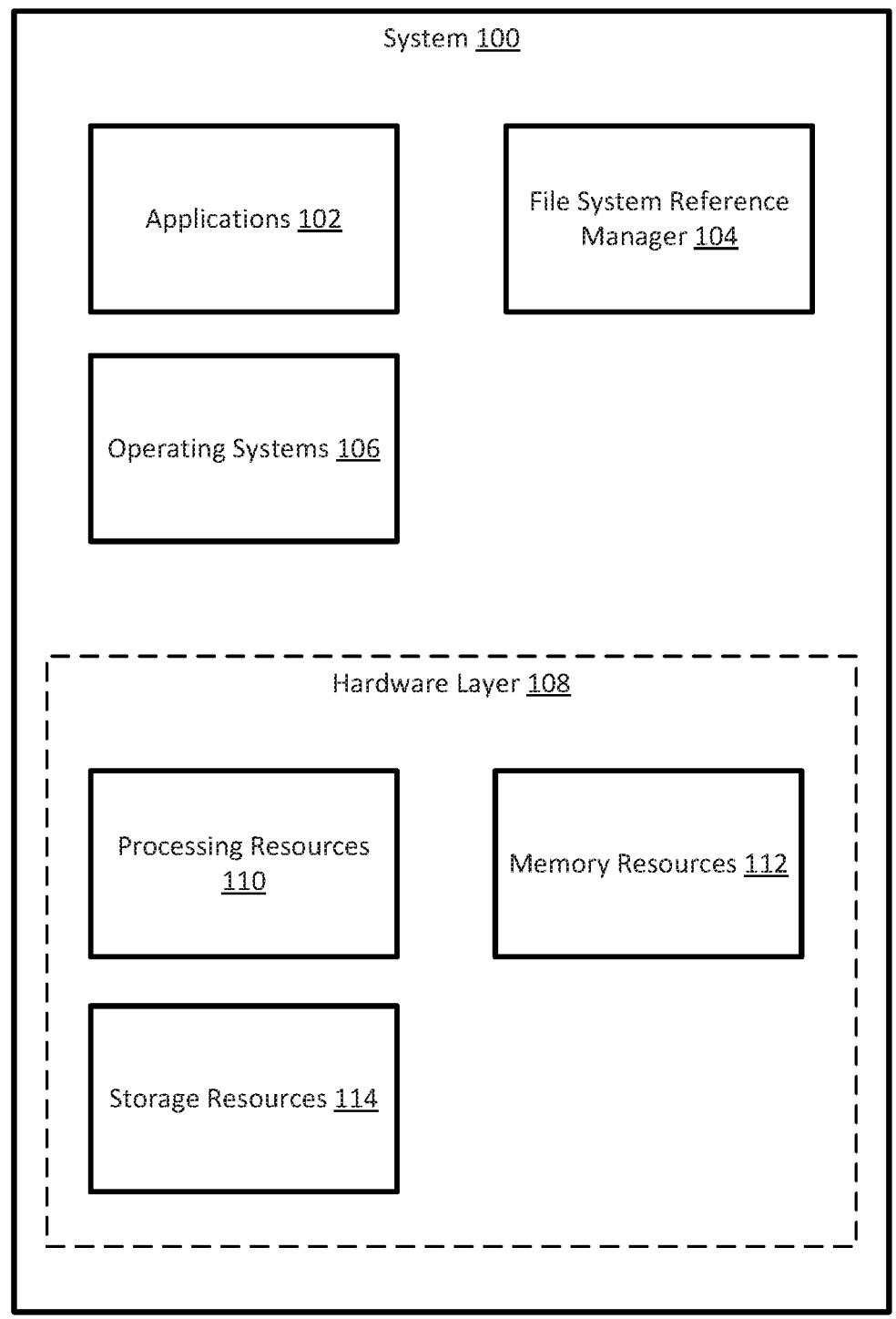
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for assigning file system references. A file system reference may be a data structure used to enable an entity (e.g., an application) to access data managed by a file system. The entity may be unable to access the data managed by the file system prior to having a file system reference assigned to the entity.

To assign file system references, a system in accordance with embodiments of the invention may pre-allocate file system references prior to when the file system references are needed for assignment purposes. The pre-allocated file system references may be stored in an in-memory data structure. By pre-allocating and storing the file system references in memory, a system in accordance with embodiments of the invention may be able to handle servicing of a higher file system reference assignment loads by avoiding the computational impact of assigning file system references via file system managers or other entities that rely on the use of storage resources for performing such assignments.

FIG. 1 shows a system (100) in accordance with one or more embodiments of the invention. The system (100) may provide any number of computer implemented services. The computer implemented services may include, for example, database services, file serving, electronic communication services, etc.

To provide such services, the system (100) may include any number of applications (102). Each of the applications (102) may, in isolation or cooperation with other applications and/or other entities, provide all, or a portion, of the computer implemented services provided by the system (100). The system (100) may include (e.g., host) none, one, or any number of applications. Different application may provide similar and/or different services.

When providing services, the applications (102) may utilize computing resources (e.g., 110, 112, 114) of the system (100). The computing resources may include, for example, processing resources (110), memory resources (112), and/or storage resources (114). The computing resources may be provided by a hardware layer (108) of the system (100).

The hardware layer (108) may represent the computing resources provided by computing devices of the system (100). Each of the computing devices of the system (100) may include hardware that contributes computing resources (e.g., 110, 112, 114) to the system (100). For additional details regarding computing devices, refer to FIG. 9.

To manage the use of the computing resources by the applications (102) and/or other entities, the system (100) may include (e.g., host) any number of operating system (106). The operating system (106) may manage the hardware layer (108). Managing the hardware layer (108) may include allocating and/or enabling access to portions of the computing resources (e.g., 110, 112, 114) provided by the hardware layer (108) to the applications (102).

For example, to enable the applications (102) to store data for future use, the operating systems (106) may include file system managers or other management entities that logically define the layout of stored data in physical storage devices. The file system managers may interact with the applications (102) to enable the applications (102) to (i) store data in physical storage devices of computing devices of the hardware layer (108) for which the file system managers logically define the layout of stored data and (ii) read data from the physical storage devices.

To enable the applications (102) to store and read data, the file system managers may dynamically assign file system references to the applications (102) before the respective applications (102) are allowed to store/read data from the file systems. In other words, to provide file system access to the applications (102).

The file system managers may utilize the file system references to service data access requests (e.g., requests to store data or read stored data) from the applications (102) and/or other entities. For example, the file system may require that the file system reference be included as part of data access requests. By doing so, the file system manager may be able to identify a requesting entity using the file system reference.

When a file system manager assigns a file system reference, the file system reference may need to be recorded as being previously assigned so that the file system reference is not provided to multiple entities. Assignment information with respect to file system references may be stored in one or more of the physical storage devices managed (in part or completely) by the file system manager.

Due to the prevalence of parallel processing and/or out of order processing, assigning a file system reference may require temporarily locking of access to the file system during the assignment. For example, if multiple file system reference requests need to be serviced during the same period of time, parallel processing and/or out of order processing may cause the same file system reference to be assigned to multiple entities if the file system is not locked (e.g., limiting access). Consequently, file system reference assignments via a file system manager may temporarily prevent entities from access to the file system due to (i) locking of the file system or (ii) waiting for queued file system reference requests to be processed.

However, locking the (or a portion of the) file system during a file system reference assignment may impact the ability of the applications (102) and/or other entities to provide their functionalities. For example, when multiple entities simultaneously need to be provided file system references, the file system may be locked for periods of time that impact the ability of the applications (102) and/or other entities to provide their services that depend on having access to the storage resources (114).

Embodiments of the invention may address the above and/or other concerns by providing a system (100) that includes a file system reference manager (104). The file system reference manager (104) may manage the assignment of file system references to any number of entities (e.g., the applications (102)).

To assign file system references, the file system reference manager (104) may obtain file system references from file system managers and store the file system references as part of an in-memory data structure using memory resources (112). In other words, the file system reference manager (104) may pre-allocate file system references prior to when the need for allocating the file system references arises. Consequently, the allocation of the file system references for pre-allocation purposes may be performed during periods of time that are unlikely to impact the ability of the applications (102) and/or other entities to provide their services.

When an entity requests a file system reference from one of the operating systems (106) (e.g., from a file system manager of an operating system), the file system reference manager (104) may service (rather than a file system manager) the file system reference request using the in-memory data structure. In other words, by utilizing a pre-allocated file system reference. By doing so, the potential impact on the functionality of the applications (102) and/or other entities due to allocation of file system references may be avoided.

Additionally, by utilizing an in-memory data structure, the file system reference manager (104) may lock access to the in-memory data structure (to avoid similar collision issues, as discussed with respect to allocation of file system references via file system managers) for far smaller amounts of time than would be required to lock a file system when a file system manager allocates a file system reference. For example, only a portion of the in-memory data structure may need to be temporarily locked for allocation purposes and due to the far greater access speed of memory (in contrast to access speeds for storage), the amount of time required to allocate a file system reference using the in-memory data structure may be far less than the amount of time required to allocate a file system reference using data structures stored in storage.

When providing its functionality, the file system reference manager (104) may perform all, or a portion, of the methods illustrated in FIGS. 3-7. For additional details regarding in-memory data structures, refer to FIG. 1.

Each of the components of the system of FIG. 1 may be operably connected to each other and/or other entities (not shown) using any combination and quantity of wired and/or wireless networks. Each component of the system is discussed below.

The applications (102), file system reference manager (104), and/or operating systems (106) may be implemented using computing devices (e.g., computing devices of the hardware layer (108). The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 3-8. The applications (102), file system reference manager (104), and/or operating systems (106) may be implemented using other types of computing devices without departing from the invention. For additional details regarding computing devices, refer to FIG. 9.

Figure 9:
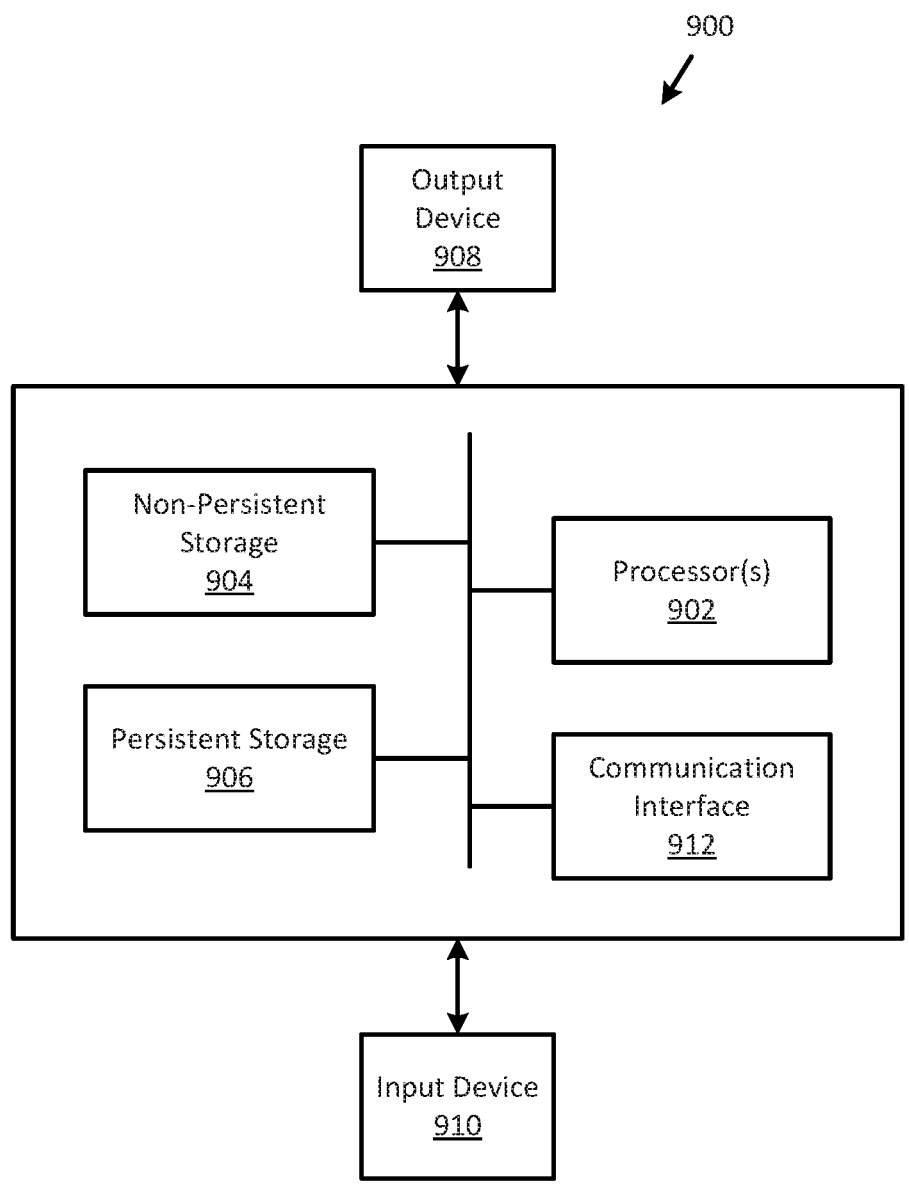
FIG. 9 shows a diagram of a computing device in accordance with one or more embodiments of the invention.

The hardware layer (108) may be implemented using computing devices (e.g., refer to FIG. 9). The computing devices may be, for example, mobile phones, tablet computers, laptop computers, desktop computers, servers, or cloud resources. The computing devices may include hardware devices including one or more processors, memory (e.g., random access memory), and persistent storage (e.g., disk drives, solid state drives, etc.). The aforementioned hardware devices may provide computing resources including the processing resources (110), the memory resources (112), and/or the storage resources (114). As discussed above, the operating systems (106) and/or the file system reference manager (104) may enable all, or a portion, of the computing resources (e.g., 110, 112, 114) to be utilized by the applications (102) and/or other entities). The hardware layer (108) may be implemented using other types of computing devices without departing from the invention. For additional details regarding computing devices, refer to FIG. 9.

While the system of FIG. 1 has been illustrated as including a limited number of specific components, a system in accordance with embodiments of the invention may include additional, fewer, and/or different components without departing from the invention.

Figure 2:
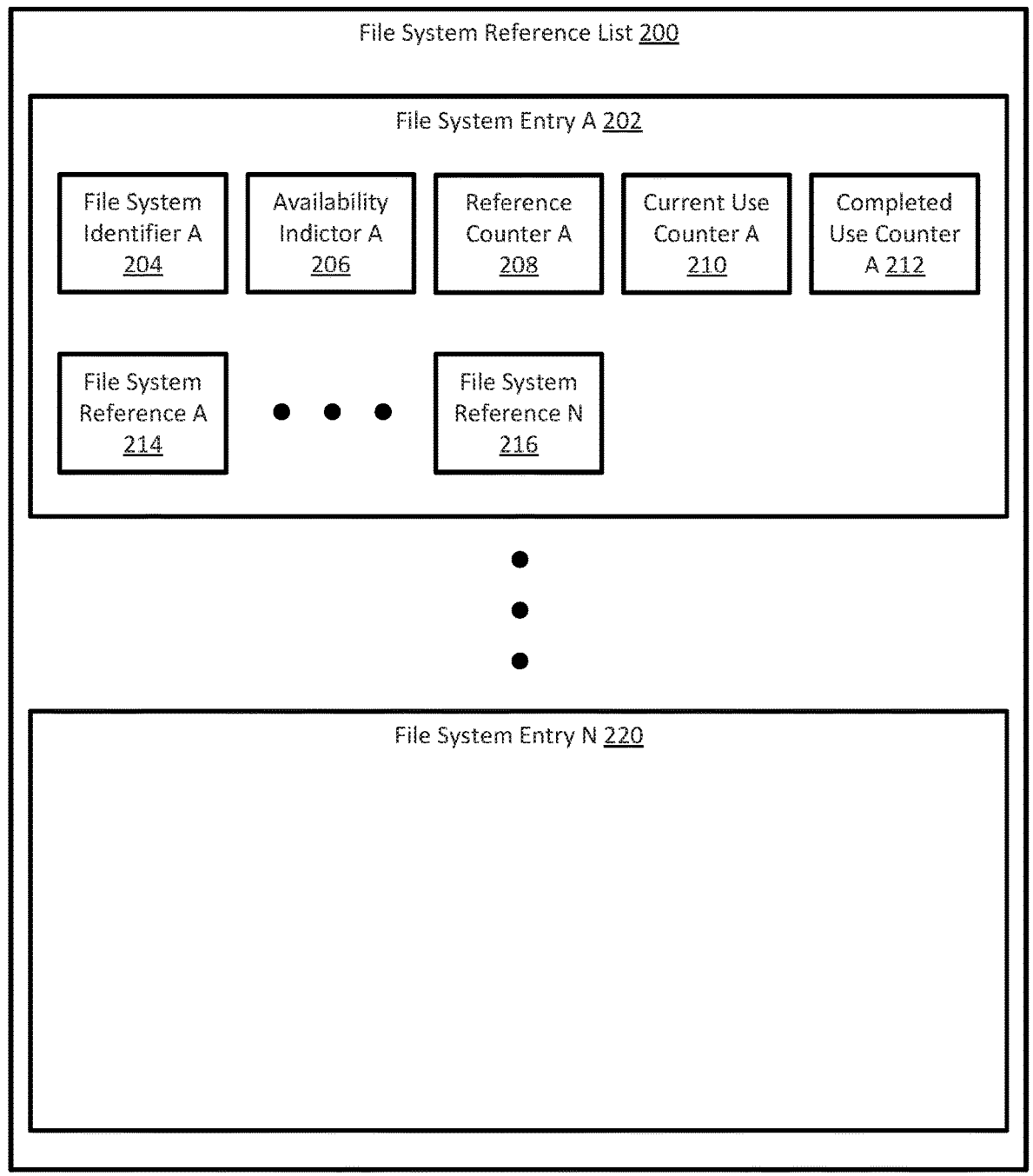
FIG. 2 shows a diagram of a file system reference list in accordance with one or more embodiments of the invention.

As discussed above, the system of FIG. 1 may utilize an in-memory data structure to assign file system references. FIG. 2 shows a diagram of an example of a file system reference list (200) in accordance with embodiments of the invention. The file system reference list (200) may be an in-memory data structure that may be used to assign file system references.

The file system reference list (200) may include any number of entries (e.g., 202, 220). Each of the entries may include information that may be used to assign file system references.

Each of the file system entries (e.g., 202, 220) may include (i) a file system identifier (e.g., 204), (ii) an availability indicator (e.g., 206), counters (e.g., 208, 210, 212), and/or file system references (e.g., 222, 224). Each of these portions of the entries of the file system reference list (200) is discussed below.

The file system identifier (e.g., 204) may be a data structure that includes information that identifies a file system for which the entry (e.g., 202) includes information that may be used to assign file system references for the file system. For example, the file system identifier (e.g., 204) may be a unique identifier such as a name that allows the file system associated with the entry to be discriminated from other file systems that are not associated with the entry.

The availability indicator (e.g., 206) may be a data structure that includes information that identifies whether the file system for which the entry (e.g., 202) includes information is available. In other words, whether the file system identified by the file system identifier (e.g., 204) of the entry is accessible. For example, file systems may be rendered inaccessible from time to time or otherwise removed from a system. For example, the availability indicator (e.g., 206) may include a flag that indicates whether the file system associated with the entry is available.

The reference counter (e.g., 208) may be a data structure that includes information regarding which of the file system references (e.g., 214, 216) have been assigned. In other words, as file system references are assigned the reference counter (e.g., 208) may enable the file system references that have not been assigned to be discriminated from the file system references that have been assigned.

For example, the reference counter (e.g., 208) may be a numerical value that is incremented/decremented when a file system reference is assigned. The value of the numerical value may indicate a corresponding value of a file system reference that has not been assigned and for which higher/lower values of reference counters have not yet been assigned.

In another example, the reference counter (e.g., 208) may be a numerical value that indicates a position within a logical ordering of the file system references that divides the file system references into a first group that includes file system references that have been assigned and a second group that includes file system references that have not been assigned.

The current use counter (e.g., 210) may be a data structure that specifies whether an assignment of a file system reference has been started. In other words, when an assignment of a file system reference is initiated, the current use counter (e.g., 210) may be incremented or decremented to indicate that the assignment has started. For example, current use counter (e.g., 210) may be a numerical value that is incremented/decremented when a file system reference assignment is initiated.

The completed use counter (e.g., 212) may be a data structure that specifies whether an assignment of a file system reference that has been started has also completed. In other words, after an assignment of a file system reference is initiated, the completed use counter (e.g., 212) may be incremented or decremented when the assignment is completed to indicate that the assignment has completed. For example, the completed use counter (e.g., 212) may be a numerical value that is incremented/decremented when a file system reference assignment is initiated.

The values of the current use counter (e.g., 210) and the completed use counter (e.g., 212) may be utilized to ascertain (i) whether an assignment has started and (ii) whether a started assignment has completed. For example, consider a scenario where the current use counter (e.g., 210) and the completed use counter (e.g., 212) are implemented as respective counters that are incremented by a file system reference manager (e.g., 104, FIG. 1) upon initiation/completion of a file system reference assignment. When an assignment is initiated, the value of the current use counter (e.g., 210) may be different from the completed use counter. When an assignment is completed (indicating that another assignment may be initiated without concern for collision with a currently being performed assignment), the value of the completed use counter (e.g., 212) may match the value of the current use counter (e.g., 210).

Accordingly, these counters, in combination, may indicate an activity state of the corresponding entry. When an entry is in an active activity state, the entry may be used to perform an assignment of a file system reference. In other words, when in an active activity state, a file system reference may be performed without risking collision with an assignment that is currently being performed. Consequently, setting the values of these counters to the same value and/or otherwise indicating an active activity state may place the entry into an unlocked state. That is, the file system reference manager (e.g., 104, FIG. 1) and/or other entities may view the entry as available for reading/modifying/otherwise utilizing when in the active activity state.

In contrast, when the entry is in an inactive activity state, as indicated by the counters having different values, the entry (e.g., 202) may be locked and unusable to perform an assignment of a file system reference. In other words, when in an inactive activity state, a file system reference may not be performed without risking collision with an assignment that is currently being performed. Consequently, setting the values of these counters to different values and/or otherwise indicating an inactive activity state may place the entry into a locked state. That is, the file system reference manager (e.g., 104, FIG. 1) and/or other entities may view the entry (e.g., 202) as unavailable for reading/modifying/otherwise utilizing when in the inactive activity state.

The file system references (e.g., 214, 216) may be data structures that include file system references obtained from a file system manager. For example, the file system references included in the file system references (e.g., 214, 216) may be obtained from a file system manager of a file system identified by the file system identifier (e.g., 204). The file system entry (e.g., 202) may include any number of file system references (e.g., 214, 216). Each of the file system references may, as discussed above, include information usable to access the file system identified by the file system identifier (e.g., 204).

The file system reference list (200) may be stored in memory of the system of FIG. 1. In other words, the file system reference list (200) may be in in-memory data structure. A copy of the file system reference list (200) may be stored in storage without departing from the invention.

While the file system reference list (200) has been illustrated as including a limited amount of specific information, the file system reference list (200) may include addition, less, and/or different information without departing from the embodiments of the invention. Further, the file system reference list (200) may be combined with other data structures, subdivided into any number of data structures, may be stored in other locations (e.g., in memory of another device), and/or spanned across any number devices without departing from embodiments of the invention. The file system reference list (200) may be implemented using, for example, lists, tables, linked lists, databases, and/or other types of data structures.

As discussed above, the system of FIG. 1 may provide file system assignment services to enable applications hosted by the system of FIG. 1 to access various file systems used to organize the data of the system of FIG. 1. FIGS. 3-7 show diagrams of methods that may be performed by components of the system of FIG. 1 when providing file system assignment services.

Figure 3:
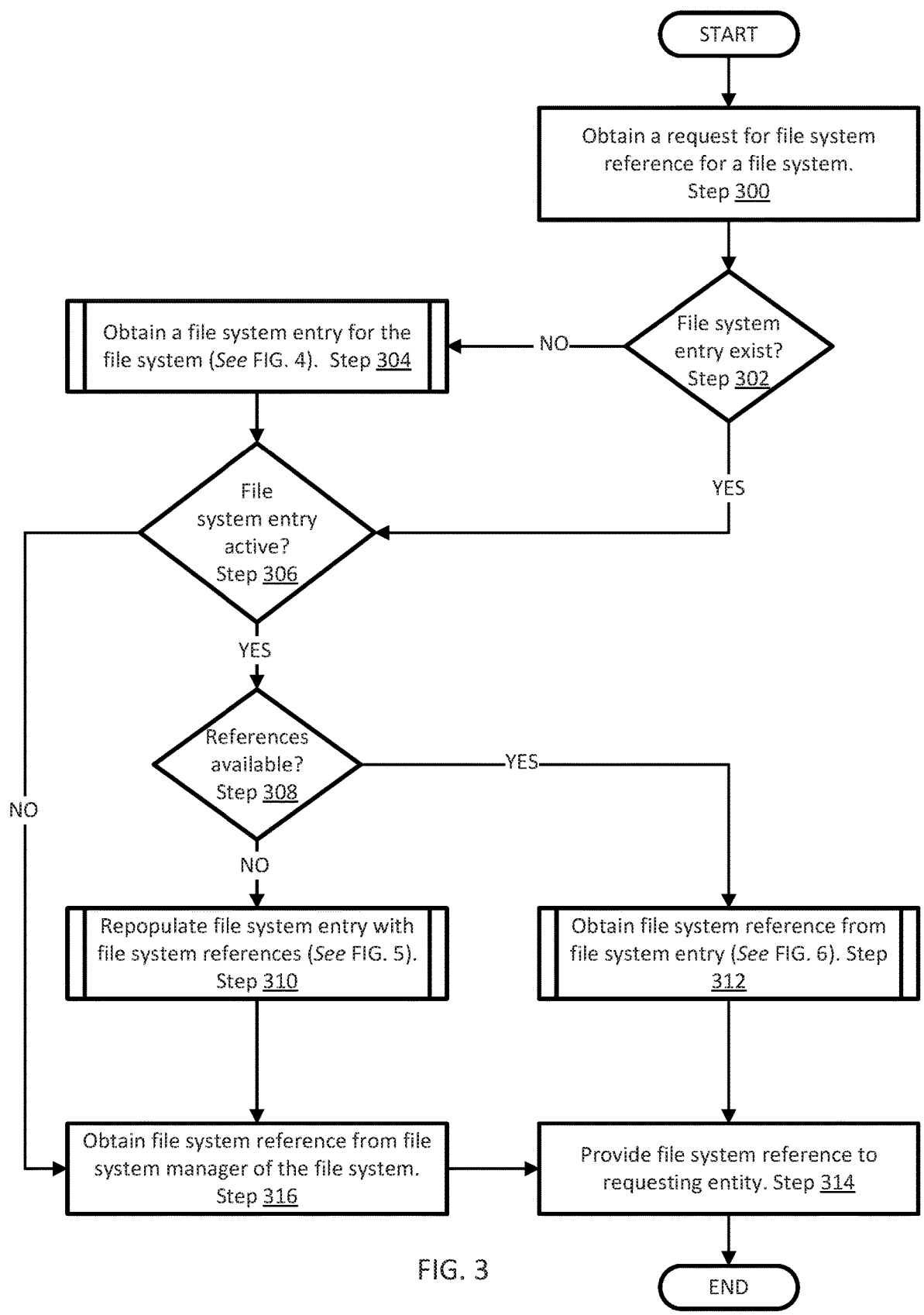
FIG. 3 shows a flowchart of a method of servicing a file system reference request in accordance with one or more embodiments of the invention.

FIG. 3 shows a flowchart of a method in accordance with one or more embodiments of the invention. The method depicted in FIG. 3 may be used to provide backup generation services in accordance with one or more embodiments of the invention. The method shown in FIG. 3 may be performed by, for example, a file system reference manager (e.g., 104, FIG. 1). Other components of the system in FIG. 1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a request for a file system reference for a file system is obtained. The file system reference request may be obtained from, for example, an application. The file system reference may be obtained via a message from the application.

In step 302, it is determined whether a file system entry for the file system exists. The determination may be made by comparing an identifier of the file system to file system entries included in existing file system entries to determine whether the file system entry exists (e.g., determine whether a match is made). If the file system entry (e.g., 202, FIG. 2) exists, the method may proceed to step 306. If the file system entry does not exist, the method may proceed to step 304.

In step 306, it is determined whether the file system entry is active. In other words, whether the file system entry is being used. The determination may be made by comparing the values of the current use counter (e.g., 210) and the completed use counter (e.g., 212) of the file system entry. If the values of the counters match, the file system entry may be determined as being active (e.g., usable without collision). If the values of the counters do not match, the file system entry may be determined as being inactive (e.g., unusable without collision).

If the file system entry is active, the method may proceed to step 308. If the file system entry is not active, the method may proceed to step 316.

In step 308, it is determined whether any file system references of the file system entry are available. The determination may be made based on a value of the reference counter (e.g., 208, FIG. 2). For example, if the value of the reference counter exceeds the total number of file system references included in the file system entry, it may be determined that there are no available file system references of the file system entry.

If it is determined that there are available file system references of the file system entry, the method may proceed to step 312. If it is determined that there are no available file system references of the file system entry, the method may proceed to step 310.

In step 310, the file system entry is repopulated with file system references. Repopulating the file system entry may cause new file system references to be added to the file system entry that may be assigned to entities. The file system entry may be repopulated via the method illustrated in FIG. 5.

In step 316, a file system reference is obtained from the file system manager of the file system. For example, a request for the file system reference may be sent to the file system manager. The file system manager may provide the file system reference in response to the request. The file system reference provided by the file system manager may not be duplicative of any of the file system references included in the file system entry. As discussed above, the file system references included in the file system entry may be obtained from the file system manager. Consequently, the file system manager may not provide a duplicative file system reference because the file system manager is aware of all file system references that have been previously allocated.

The method may proceed to step 314 following step 316 and end following step 314.

Returning to step 302, the method may proceed to step 304 following step 302 if the file system entry for the file system does not exist.

In step 304, a file system entry for the file system is obtained. The file system entry may be obtained via the method illustrated in FIG. 4. The method may proceed to step 306, discussed above, following step 304.

Returning to Step 308, the method may proceed to step 312 follow step 308 if it is determined that a file system reference in the file system entry is available.

In step 312, a file system reference is obtained from the file system entry. The file system reference may be one of the file system references included in the file system entry. The file system reference may be obtained from the file system entry via the method illustrated in FIG. 6.

In step 314, the file system reference is provided to a requesting entity. The file system reference may be provided by sending a copy of the file system reference to the requesting entity (e.g., the entity for which the request of step 300 was initiated).

The method may end following step 314.

Returning to step 306, the method may proceed to step 316 following step 306 if the file system entry is not active. Step 316 is discussed above.

Thus, via the method illustrated in FIG. 3, a system in accordance with embodiments of the invention may provide a method for providing filing system references on demand without obtaining the file system references from a file system manager at the time in which the request for the file system reference is obtained. Rather, the system may pre-allocate file system references and store the pre-allocated file system references in an in-memory data structure. By doing so, embodiments of the invention may decrease (i) the amount of time required for file system references to be provided and/or (ii) the amount of time during which access to file system references is locked (e.g., locking access to the in-memory data structure). Accordingly, a system in accordance with embodiments of the invention may be capable of servicing a much higher file system reference request load than systems that do not utilize an in-memory data structure.

Figure 4:
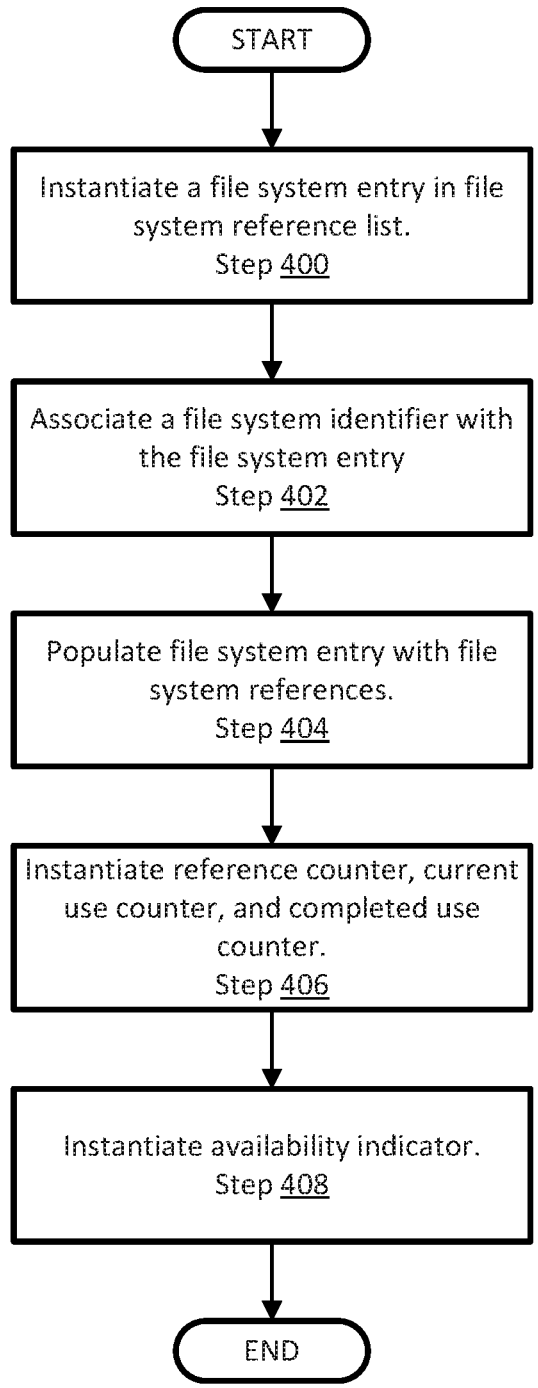
FIG. 4 shows a flowchart of a method of obtaining a file system entry in accordance with one or more embodiments of the invention.

As discussed above, a file system entry may be obtained when the method of FIG. 3 is performed in scenarios in which the file system entry does not exist. FIG. 4 shows a flowchart of a method in accordance with one or more embodiments of the invention. The method depicted in FIG. 4 may be used to obtain a file system entry in accordance with one or more embodiments of the invention. The method shown in FIG. 4 may be performed by, for example, a file system reference manager (e.g., 104, FIG. 1). Other components of the system in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a file system entry is instantiated in a file system reference list. The file system entry may be instantiated in the file system reference list by adding a new file system entry to the file system reference list. The file system entry may be instantiated by reallocating an existing file system entry of the file system reference list.

In step 402, a file system identifier is associated with the file system entry. The file system identifier may be associated by adding a copy of the file system identifier to the file system entry.

In step 404, the file system entry is populated with file system references. The file system references may be obtained from a file system manager that manages a file system that is associated with the file system entry. The file system references may be obtained by requesting them from the file system manager. In response, the file system manager may provide the file system references. The file system entry may be populated by adding copies of the file system references to the file system entry.

In step 406, a reference counter, a current use counter, and a completed use counter are initialized. The reference counter may be initialized by adding a counter to the file system entry and setting the value of the counter in a manner to indicate that all of the file system references of the file system entry are available (e.g., have not be assigned).

The current use counter may be initialized by adding a counter to the file system entry and setting the value of the counter in a manner to indicate that no assignments of file system references have been initiated.

The completed use counter may be initialized by adding a counter to the file system entry and setting the value of the counter in a manner to indicate that no assignments of file system references have been started but are not yet complete. For example, the value of the completed use counter may be set to match that of the current use counter.

In step 408, an availability indicator is instantiated. The availability indicator may be instantiated by adding a flag to the file system entry that indicates that the file system associated with the file system entry is available.

The method may end following step 408.

Figure 5:
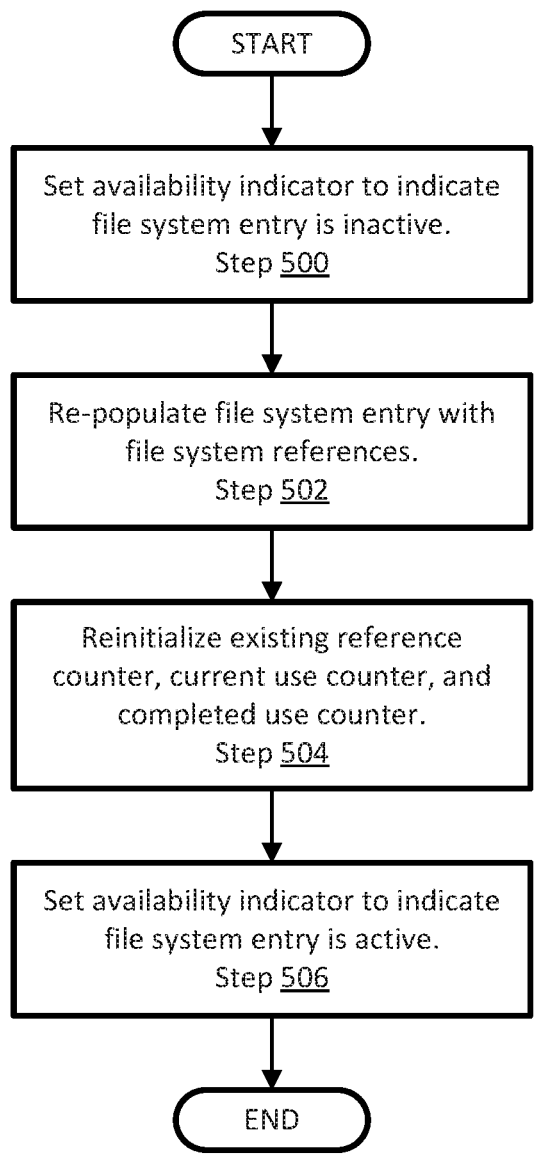
FIG. 5 shows a flowchart of a method of repopulating a file system entry with file system references in accordance with one or more embodiments of the invention.

Returning to FIG. 3, a file system entry may be repopulated when the method of FIG. 3 is performed in scenarios in which an existing file system entry does not include any file system references to assign. FIG. 5 shows a flowchart of a method in accordance with one or more embodiments of the invention. The method depicted in FIG. 5 may be used to repopulate a file system entry in accordance with one or more embodiments of the invention. The method shown in FIG. 5 may be performed by, for example, a file system reference manager (e.g., 104, FIG. 1). Other components of the system in FIG. 1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, an availability indicator of a file system entry is set to indicate that the file system entry is inactive. In other words, the availability indicator is set to indicate that the file system entry may not be utilized.

In step 502, the file system entry is re-populated with file system references. The file system references may be obtained from a file system manager that manages a file system that is associated with the file system entry. The file system references may be obtained by requesting them from the file system manager. In response, the file system manager may provide the file system references. The file system entry may be re-populated by removing existing file system references from the file system entry and adding copies of the newly obtained file system references to the file system entry.

In step 504, the existing reference counter, current counter, and completed use counter are reinitialized.

The reference counter may be reinitialized setting the value of the counter in a manner to indicate that all of the file system references of the file system entry are available (e.g., have not been assigned).

The current use counter may be reinitialized by setting the value of the counter in a manner to indicate that no assignments of file system references have been initiated.

The completed use counter may be reinitialized by setting the value of the counter in a manner to indicate that no assignments of file system references have been started but are not yet complete. For example, the value of the completed use counter may be set to match that of the current use counter.

In step 506, the availability indicator is set to indicate that the file system entry is active. The availability indicator may be a flag of the file system entry that indicates that the file system associated with the file system entry is available.

The method may end following step 506.

Figure 6:
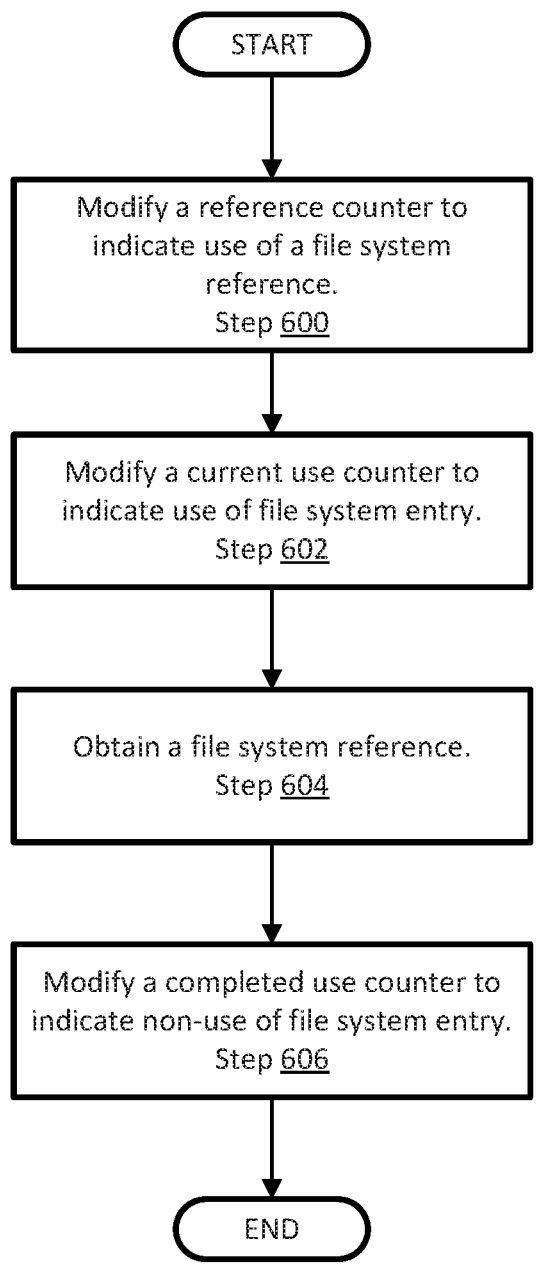
FIG. 6 shows a flowchart of a method of obtaining a file system reference in accordance with one or more embodiments of the invention.

Returning to FIG. 3, file system references may be obtained from a file system entry when the method of FIG. 3 is performed. FIG. 6 shows a flowchart of a method in accordance with one or more embodiments of the invention. The method depicted in FIG. 6 may be used to repopulate a file system entry in accordance with one or more embodiments of the invention. The method shown in FIG. 6 may be performed by, for example, a file system reference manager (e.g., 104, FIG. 1). Other components of the system in FIG. 1 may perform all, or a portion, of the method of FIG. 6 without departing from the invention.

While FIG. 6 is illustrated as a series of steps, any of the steps may be omitted, performed in a different order, additional steps may be included, and/or any or all of the steps may be performed in a parallel and/or partially overlapping manner without departing from the invention.

In step 600, a reference counter is modified to indicate use of a file system reference. The reference counter may be modified by incrementing, decrementing, or otherwise modifying the value of the reference counter to indicate use of the file system reference. In other words, the file system reference that is being assigned.

In step 602, a current use counter is modified to indicate use of the file system entry. The current use counter may be modified by incrementing, decrementing, or otherwise modifying the value of the current use counter to indicate that an assignment has been initiated using the file system entry. In other words, to indicate that other entities should not use the file system entry (e.g., that the entry is locked).

In step 604, a file system reference is obtained. The file system reference may be obtained by identifying the file system reference in the file system entry based on a value of the reference counter of the file system entry. As discussed above, the reference counter may have a value that identifies a file system reference of the file system entry that is not assigned and is available to be assigned.

In step 606, a completed use counter is modified to indicate non-use of the file system entry. The completed use counter may be modified by incrementing, decrementing, or otherwise modifying the value of the completed use counter to indicate that an assignment has been initiated using the file system entry and that the assignment is completed. In other words, to indicate that other entities should may use the file system entry (e.g., that the entry is unlocked).

The method may end following step 606.

Utilizing the methods illustrated in FIGS. 3-6, a system in accordance with embodiments of the invention may assign file system references so that any number of entities (e.g., application) may access data stored in file systems. The method may utilize and in-memory data structure that includes pre-allocated file system references. By doing so, a system in accordance with embodiments of the invention may reduce the amount of time entities that desire access to data stored in file systems are required to wait for file access. Consequently, a system in accordance with embodiments of the invention may provide an improved user experience by more quickly providing computer implemented services to users.

Figure 7:
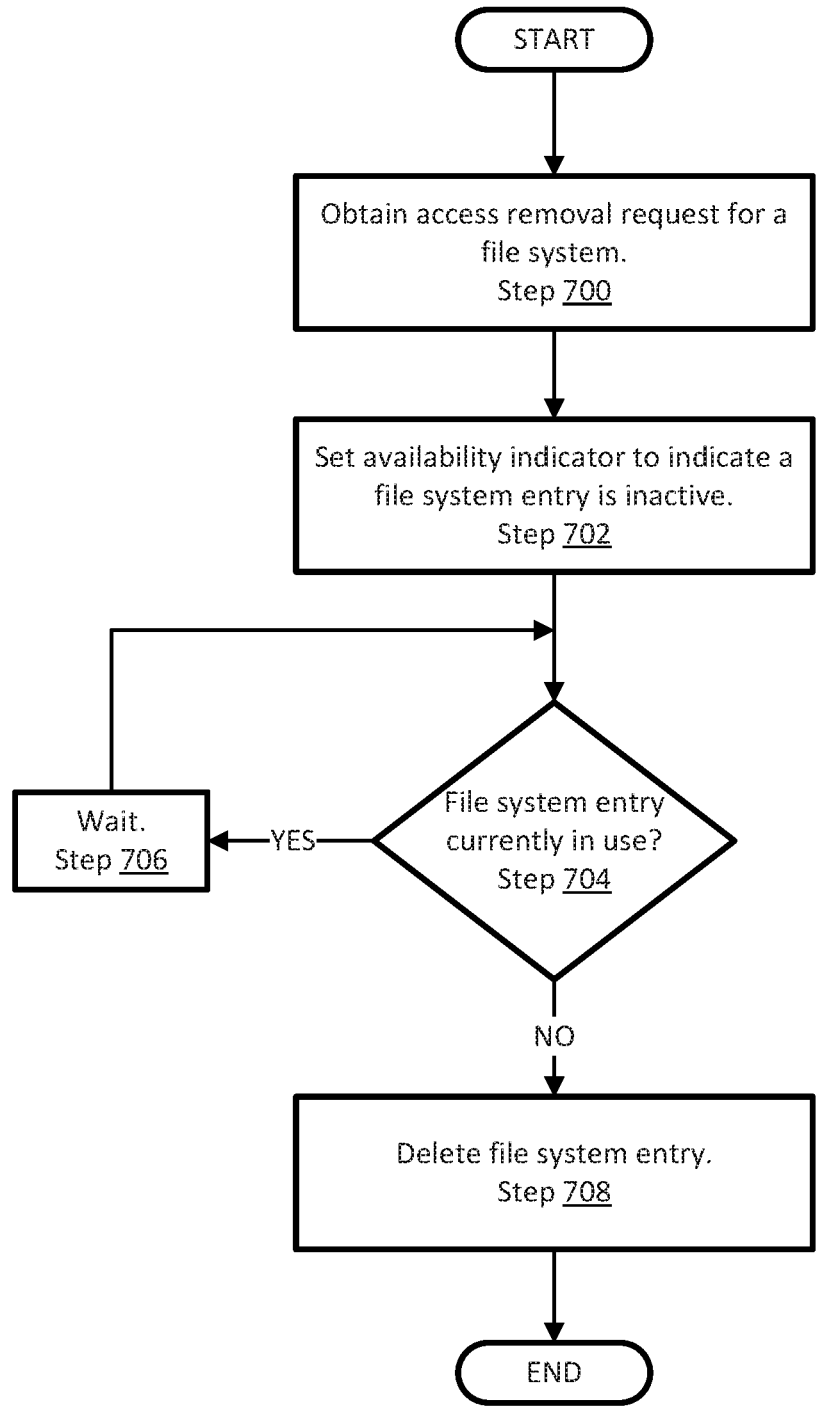
FIG. 7 shows a flowchart of a method of servicing an access removal request in accordance with one or more embodiments of the invention.

In some cases, it may be desirable to remove access to file systems that include data. For example, file systems may need to be unmounted. FIG. 7 shows a flowchart of a method in accordance with one or more embodiments of the invention. The method depicted in FIG. 7 may be used to remove access to a file system in accordance with one or more embodiments of the invention. The method shown in FIG. 7 may be performed by, for example, a file system reference manager (e.g., 104, FIG. 1). Other components of the system in FIG. 1 may perform all, or a portion, of the method of FIG. 7 without departing from the invention.

While FIG. 7 is illustrated as a series of steps, any of the steps may be omitted, performed in a different order, additional steps may be included, and/or any or all of the steps may be performed in a parallel and/or partially overlapping manner without departing from the invention.

In step 700, obtain an access removal request for a file system. The access removal request may, for example, request that the file system be unmounted. The access removal request may be obtained from a message received from any entity (e.g., an application, an operating system, etc.).

In step 702, set an availability indicator to indicate that a file system entry is inactive. The file system entry may be associated with the file system (e.g., may include an identifier of the file system). The availability indicator may be set by changing a value of the availability indicator to indicate that the file system entry is inactive.

In step 704, it is determined whether the file system entry is currently in use. The determination may be made by comparing the values of at least two counter included in the file system entry. For example, the value of a current use counter (e.g., 210, FIG. 2) may be compared to the value of a completed use counter (e.g., 212, FIG. 2). If the values match, then the file system entry may be determined as currently not being in use. If the values differ, then the file system entry may be determined as currently being in use.

If it is determined that the file system entry is currently in use, the method may proceed to step 706. If it is determined that the file system entry is not currently in use, the method may proceed to step 708.

In step 706, some amount of time may be waited. In other words, when the file system entry is currently in use, the system may wait until the file system entry is not currently in use before proceeding to step 708.

In step 708, the file system entry is deleted.

The method may end following step 708.

Using the method illustrated in FIG. 7, a file system may be rendered inaccessible (e.g., unmounted) even when file system references are provided using an in-memory data structure rather than being obtained by a file system manager.

To further clarify embodiments of the invention, a non-limiting example is provided in FIGS. 8.1-8.3. FIG. 8.1 may illustrate a system similar to that illustrated in FIG. 1. FIGS. 8.2-8.3 may illustrate interactions between components and/or actions performed by the components of the system of FIG. 8.1 over time. For the sake of brevity, only a limited number of components of the system of FIG. 1.1 are illustrated in each of FIGS. 8.1-8.3.

Example

Consider a scenario as illustrated in FIG. 8.1 in which a database (800) application is utilizing resources provided by a system. To provide resources to the database (800), an operating system (802) utilizes services provided by a file system manager (804) and a file system reference manager (806).

To provide file system reference assignment services, the file system reference manager (806) utilizes a file system reference list (816) stored in a memory module (814).

At the point in time illustrated in FIG. 8.1, a new hard disk (810) has been added to the system. The file system manager (804) manages the file system (812) that organizes the data stored in the hard disk (810).

Turning to FIGS. 8.2-8.3, the aforementioned figures illustrate interactions and actions between components of the system of FIG. 8.1. In these figures, the relative occurrence in time of the interactions progresses from the top of each figure (i.e., earlier in time) to the bottom of each figure (i.e., later in time). FIG. 8.3 is a continuation of the diagram of FIG. 8.2. In other words, element 820 indicates the first interaction that occurs in time while element 840 indicates the last interaction that occurs.

Turning to FIG. 8.2, after the hard disk is added at a first point in time, the file system reference manager (806) identifies that a new file system (820) is available for which the file system reference manager (806) may provide file system reference assignment services.

In response identifying the new file system (820), the file system reference manager (806) attempts to obtain file system references for the file system by sending a references request (822) to the file system manager (804) that manages the new file system (820). The references request (822) is a request for file system references from the newly added file system.

In response to obtaining the references request (822), the file system manager (804) allocates a number of references and provides the references (824) to the file system reference manager (806). While the file system manager (804) is allocating the number of references, the file system manager (804) locks the file system resulting in other entities not being able to access the data in the file system during the allocation.

After the file system reference manager (806) obtains the references (824), the file system reference manager (806) generates a file system entry in memory (826) for the file system. The generated entry includes the references (824), flags, and counters as discussed with respect to FIG. 2.

After the file system entry is generated, the database (800) requests access to the files system by sending a reference request (828) to the operating system. In response to receiving the reference request (828), the operating system (802) forwards the reference request (830) to the file system reference manager (806).

In response to receiving the reference request (830), the file system reference manager (806) verifies that the file system entry is active (832). To do so, the file system reference manager (806) checks to see whether the current use counter and completed use counter of the file system entry have the same value. In this example, the counters have the same value and the file system reference manager (806) proceeds. Had the counters had different values, the file system reference manager (806) would have waited until the aforementioned counters had the same value before proceeding to verify that the file system entry was not in use for other file system reference assignments.

After verifying that the file system entry is active (832), the file system reference manager (806) locks the file system entry (834) in preparation for allocating the file system reference for the database (800). To do so, the file system reference manager (806) increments the value of the current use counter.

After locking the file system entry (834), the file system reference manager (806) obtains the file system reference (836) from the file system entry. Additionally, the file system reference manager (806) increments the reference counter to indicate that the file system reference (836) is allocated.

After obtaining the file system reference (836), the file system reference manager (806) provides the file system reference (838) to the database (800). By doing so, the database (800) is able to access data in the file system managed by the file system manager (804) using the file system reference (838).

After providing the file system reference, the file system reference manager (806) unlocks the file system entry (840) as illustrated in FIG. 8.3. To do so, the file system reference manager (806) increments the completed use counter of the file system entry. By doing so, the current use counter and completed use counters have the same value thereby indicating that the file system entry is available for use (e.g., active).

End of Example

Thus, as illustrated in FIGS. 8.1-8.3, embodiments of the invention may provide a method for providing file system references on demand without needing to lock the file system at the time of assignment of the file system references. By doing so, a system in accordance with embodiments of the invention may be able service a much larger file system reference assignments without impacting a user experience.

As discussed above, embodiments of the invention may be implemented using computing devices. FIG. 9 shows a diagram of a computing device in accordance with one or more embodiments of the invention. The computing device (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), input devices (910), output devices (908), and numerous other elements (not shown) and functionalities. Each of these components is described below.

In one embodiment of the invention, the computer processor(s) (902) may be an integrated circuit for processing instructions. For example, the computer processor(s) may be one or more cores or micro-cores of a processor. The computing device (900) may also include one or more input devices (910), such as a touchscreen, keyboard, mouse, microphone, touchpad, electronic pen, or any other type of input device. Further, the communication interface (912) may include an integrated circuit for connecting the computing device (900) to a network (not shown) (e.g., a local area network (LAN), a wide area network (WAN) such as the Internet, mobile network, or any other type of network) and/or to another device, such as another computing device.

In one embodiment of the invention, the computing device (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing devices exist, and the aforementioned input and output device(s) may take other forms.

Embodiments of the invention may provide a method for assigning file system references. To do so, embodiments of the invention may provide a system that pre-allocates file system references before they are needed. Specifically, embodiments of the invention may store pre-allocated file system references in an in-memory data structure. By doing so, the computational impact on the system for providing file system references may be time shifted away from when the file system reference requests are received. Accordingly, a system in accordance with embodiments of the invention may be capable of servicing a larger number of file system reference assignment requests which may improve a user experience.

Thus, embodiments of the invention may address the problem of limited computational resource availability for providing file system reference assignments in a distributed environment.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A system for managing file systems, comprising:
   memory; and
   a manager programmed to:
      obtain file system references for a file system from a file system manager that utilizes storage to provide the file system references;
      store the file system references in an in-memory data structure in the memory, wherein the in-memory data structure comprises an availability indicator, a reference counter, a current use counter, and a completed use counter associated with the file system references; and
      service a file system reference request for the file system using the in-memory data structure, wherein servicing the file system reference request for the file system using the in-memory data structure comprises:
         obtaining the file system reference request;
         in response to obtaining the file system reference request:
            determining a file system entry for the file system reference request in the in-memory data structure;
            making a determination, based on that the current use counter and the completed use counter match, that a portion of the in- memory data structure associated with the file system entry is in an active activity state;
         in response to the file system entry is in the active activity state:
            obtaining a file system reference from the file system entry;
            providing the file system reference to an entity to service the file system reference request; and
            modifying the completed use counter to indicate non-use of the file system entry.

2. The system of claim 1, wherein obtaining the file system references allocates the file system references in the file system.

3. The system of claim 1, wherein the active activity state indicates that the portion of the in-memory data structure is used to assign the file system reference without colliding with a second assignment of the file system reference.

4. The system of claim 1, wherein obtaining the file system reference using the portion of the in-memory data structure comprises:
   modifying the activity state of the portion of the in-memory data structure to an inactive activity state;
   after changing the activity state and while the activity state is in the inactive activity state:
      assigning the file system reference to the entity;
      modifying the portion of the in-memory data structure to indicate that the file system reference is assigned; and
      modifying the activity state of the portion of the in-memory data structure to active.

5. The system of claim 1, wherein servicing the file system reference request for the file system using the in-memory data structure comprises:
   obtaining the file system reference request;
   in response to obtaining the file system reference request:
      making a determination that a portion of the in-memory data structure associated with the file system is in an inactive activity state;
      in response to making the determination:
         obtaining a file system reference from the file system manager; and
         providing the file system reference to an entity to service the file system reference request.

6. The system of claim 5, wherein the file system reference is not duplicative of any of the file system references.

7. A method for managing file systems, comprising:
   obtaining file system references for a file system from a file system manager that utilizes storage to provide the file system references;

storing the file system references in an in-memory data structure, wherein the in-memory data structure comprises an availability indicator, a reference counter, a current use counter, and a completed use counter associated with the file system references; and servicing a file system reference request for the file system using the in-memory data structure, wherein servicing the file system reference request for the file system using the in-memory data structure comprises:
obtaining the file system reference request;
in response to obtaining the file system reference request:
determining a file system entry for the file system reference request in the in-memory data structure;
making a determination, based on that the current use counter and the completed use counter match, that a portion of the in- memory data structure associated with the file system entry is in an active activity state;
in response to the file system entry is in the active activity state:
obtaining a file system reference from the file system entry;
providing the file system reference to an entity to service the file system reference request; and
modifying the completed use counter to indicate non-use of the file system entry.

8. The method of claim 7, wherein obtaining the file system references allocates the file system references in the file system.

9. The method of claim 7, wherein the active activity state indicates that the portion of the in-memory data structure is used to assign the file system reference without colliding with a second assignment of the file system reference.

10. The method of claim 7, wherein obtaining the file system reference using the portion of the in-memory data structure comprises:
modifying the activity state of the portion of the in-memory data structure to an inactive activity state;
after changing the activity state and while the activity state is in the inactive activity state:
assigning the file system reference to the entity;
modifying the portion of the in-memory data structure to indicate that the file system reference is assigned; and
modifying the activity state of the portion of the in-memory data structure to active.

11. The method of claim 7, wherein servicing the file system reference request for the file system using the in-memory data structure comprises:
obtaining the file system reference request;
in response to obtaining the file system reference request:
making a determination that a portion of the in-memory data structure associated with the file system is in an inactive activity state;
in response to making the determination:
obtaining a file system reference from the file system manager; and
providing the file system reference to an entity to service the file system reference request.

12. The method of claim 11, wherein the file system reference is not duplicative of any of the file system references.

13. A non-transitory computer readable medium comprising computer readable program code, which when executed by a computer processor enables the computer processor to perform a method for managing file systems, the method comprising:
obtaining file system references for a file system from a file system manager that utilizes storage to provide the file system references;
storing the file system references in an in-memory data structure, wherein the in-memory data structure comprises an availability indicator, a reference counter, a current use counter, and a completed use counter associated with the file system references; and
servicing a file system reference request for the file system using the in-memory data structure, wherein servicing the file system reference request for the file system using the in-memory data structure comprises:
obtaining the file system reference request;
in response to obtaining the file system reference request:
determining a file system entry for the file system reference request in the in-memory data structure;
making a determination, based on that the current use counter and the completed use counter match, that a portion of the in- memory data structure associated with the file system entry is in an active activity state;
in response to the file system entry is in the active activity state:
obtaining a file system reference from the file system entry;
providing the file system reference to an entity to service the file system reference request; and
modifying the completed use counter to indicate non-use of the file system entry.

14. The non-transitory computer readable medium of claim 13, wherein obtaining the file system references allocates the file system references in the file system.

15. The non-transitory computer readable medium of claim 13, wherein the active activity state indicates that the portion of the in-memory data structure is used to assign the file system reference without colliding with a second assignment of the file system reference.

16. The non-transitory computer readable medium of claim 13, wherein obtaining the file system reference using the portion of the in-memory data structure comprises:
modifying the activity state of the portion of the in-memory data structure to an inactive activity state;
after changing the activity state and while the activity state is in the inactive activity state:
assigning the file system reference to the entity;
modifying the portion of the in-memory data structure to indicate that the file system reference is assigned; and
modifying the activity state of the portion of the in-memory data structure to active.

17. The non-transitory computer readable medium of claim 13, wherein servicing the file system reference request for the file system using the in-memory data structure comprises:
obtaining the file system reference request;
in response to obtaining the file system reference request:
making a determination that a portion of the in-memory data structure associated with the file system is in an inactive activity state;
in response to making the determination:
obtaining a file system reference from the file system manager; and providing the file system reference to an entity to service the file system reference request.

* * * * *